United States Patent
Shoda et al.

(10) Patent No.: US 7,149,350 B2
(45) Date of Patent: Dec. 12, 2006

(54) IMAGE COMPRESSION APPARATUS, IMAGE DEPRESSION APPARATUS AND METHOD THEREOF

(75) Inventors: Hirokazu Shoda, Yokohama (JP); Sunao Tabata, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1052 days.

(21) Appl. No.: 09/955,290

(22) Filed: Sep. 19, 2001

(65) Prior Publication Data
US 2003/0053115 A1    Mar. 20, 2003

(51) Int. Cl.
G06K 9/36 (2006.01)
(52) U.S. Cl. .................................................... 382/166
(58) Field of Classification Search ........ 382/232–233, 382/166, 239; 358/539, 1.9, 518, 1.15–1.16
See application file for complete search history.

(56) References Cited

U.S. PATENT DOCUMENTS 5,710,826 A * 1/1998 Osawa et al. ............... 382/166
5,844,699 A * 12/1998 Usami et al. ............... 358/518
6,342,950 B1 * 1/2002 Tabata et al. ................ 358/1.6

FOREIGN PATENT DOCUMENTS

| JP | 07-203211 | * 12/1993 |
| JP | 7-203211 | 8/1995 |

OTHER PUBLICATIONS

U.S. Appl. No. 09/138,284, filed Aug. 21, 1998, Tabata et al.

* cited by examiner

Primary Examiner—Ishrat Sherali
(74) Attorney, Agent, or Firm—Foley & Lardner LLP (57) ABSTRACT

An image compression apparatus includes a color region judging section which judges a color region of a color image signal and outputs the judgment information as the judgment result, a switch which chooses one compression parameter from a plurality of compression parameters corresponding to the judgment information supplied from the color region judging section, and a compressing section which compresses color image signals corresponding to the compression parameter chosen by the switch, wherein image compression and decompression with general color balance satisfactorily adjusted by appropriately setting the compression ratio that varies in accordance with color regions as required.

6 Claims, 12 Drawing Sheets

F I G. 1

DCT coefficient (a)
| 260 | 49 | -16 | 5 | 2 | 4 | 0 | 1 |
|---|---|---|---|---|---|---|---|
| -79 | 36 | -2 | -7 | 1 | -3 | -1 | -2 |
| 0 | -8 | 3 | -2 | -2 | 1 | 5 | 1 |
| -8 | -4 | 5 | 1 | 1 | 7 | 6 | -2 |
| -2 | -6 | -1 | -4 | -4 | -1 | 0 | -1 |
| -3 | -2 | -1 | 1 | 1 | 2 | -5 | -1 |
| -4 | 1 | 1 | 0 | 0 | -2 | 2 | 0 |
| 1 | 1 | 1 | 1 | -1 | 1 | 0 | 0 |

(c)
| 16 | 4 | 2 | 0 | 0 | 0 | 0 | 0 |
|---|---|---|---|---|---|---|---|
| -7 | 3 | 0 | 0 | 0 | 0 | 0 | 0 |
| 0 | -1 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Quantization table (b)
| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 2

Grouping of finite differences of DC coefficient

| Group No. | DC finite defferences | Added bit |
|---|---|---|
| 0 | 0 | 0 |
| 1 | -1, 1 | 1 |
| 2 | -3, -2, 2, 3 | 2 |
| 3 | -7~-4, 4~7 | 3 |
| 4 | -15~-8, 8~15 | 4 |
| 5 | -31~-16, 16~31 | 5 |
| 6 | -63~-32, 32~63 | 6 |
| 7 | -127~-64, 64~127 | 7 |
| 8 | -255~-128, 128~255 | 8 |
| 9 | -511~-256, 256~511 | 9 |
| 10 | -1023~-512, 512~1023 | 10 |
| 11 | -2047~-1024, 1024~2047 | 11 |
| 12 | -4095~-2048, 2048~4095 | 12 |
| 13 | -8191~-4096, 4096~8191 | 13 |
| 14 | -16383~-8192, 8192~16383 | 14 |
| 15 | -32767~-16384, 16384~32767 | 15 |

FIG. 3A

Coding table for Group No.

| Group No. | Code length | Coded word |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |
| 12 | 10 | 1111111110 |
| 13 | 11 | 11111111110 |
| 14 | 12 | 111111111110 |
| 15 | 13 | 1111111111110 |

FIG. 3B

Grouping of finite differences of AC coefficient

| Group No. | DC finite differences | Added bit |
|---|---|---|
| 0 | 0 | 0 |
| 1 | -1, 1 | 1 |
| 2 | -3, -2, 2, 3 | 2 |
| 3 | -7~-4, 4~7 | 3 |
| 4 | -15~-8, 8~15 | 4 |
| 5 | -31~-16, 16~31 | 5 |
| 6 | -63~-32, 32~63 | 6 |
| 7 | -127~-64, 64~127 | 7 |
| 8 | -255~-128, 128~255 | 8 |
| 9 | -511~-256, 256~511 | 9 |
| 10 | -1023~-512, 512~1023 | 10 |
| 11 | -2047~-1024, 1024~2047 | 11 |
| 12 | -4095~-2048, 2048~4095 | 12 |
| 13 | -8191~-4096, 4096~8191 | 13 |
| 14 | -16383~-8192, 8192~16383 | 14 |
| 15 | -32767~-16384, 16384~32767 | 15 |
| 16 | 32753 | 0 |

FIG. 3C

| | | Group No. | | | | | |
|---|---|---|---|---|---|---|---|
| | | 0 | 1 | 2 | ----- | 14 | 15 |
| Color region information | 0 | 0000 | 00010 | 00011 | ----- | ----- | ----- |
| | 1 | 0100 | 01010 | 01011 | | | |
| | 2 | 1000 | | | | | |
| | ⋮ | | Code is assigned to each of Group No. and color region | | | | |
| | 7 | | | | | | |
| | 8 | | | | | | |

FIG. 4

| | | Group No. | | | | | |
|---|---|---|---|---|---|---|---|
| | | 0 | 1 | 2 | ----- | 14 | 15 |
| Run-length | 0 | EOB | | | | | |
| | 1 | | | | | | |
| | 2 | | | | | | |
| | ⋮ | | Huffman code assigned | | | | |
| | 14 | | | | | | |
| | 15 | ZRL | | | | | |

IMAGE COMPRESSION APPARATUS, IMAGE DEPRESSION APPARATUS AND METHOD THEREOF

BACKGROUND OF THE INVENTION

When a color image is compressed in conventional color image processing, compression is carried out by the use of human visual characteristics in that humans have poor color resolution capabilities. Consequently, the input image has the color space transformed, converted into a luminance signal and chrominance signal, and the amount of information in the chrominance signal is reduced. Examples of the kind of color spaces used for compression include YUV, L*a*b, etc. Requests have been increased for a compression technique that can achieve optimum compression, whichever color space is chosen from these color spaces.

For these requests, as disclosed in, for example, Japanese Patent Application, Jpn. Pat. Appln. KOKAI Publication No. 7-203211, a technique for compressing with parameters optimized for each color space is considered. Specifically, it is a method for preparing compression parameters on the compression side in compliance with various color spaces and carrying out compression using parameters of the color spaces chosen, and carrying out decompression on the decompression side in compliance with the color spaces on the compression side. It is a method for choosing on the compression side the color spaces used on the decompression side and then carrying out compression.

In the conventional compression method described above, it is a system for optimizing compression parameters in the color space only and carrying out compression by the use of one common parameter for individual colors on the color space. Consequently, by the characteristics specific to input apparatuses such as scanners, etc. and those specific to output apparatuses such as printers, etc., the characteristics specific to the apparatus are emphasized on the specific colors at the time of compression and decompression, and degradation of the screen quality may occur. Similarly, in the treatment after compression and decompression, the color is susceptible to characteristics specific to the apparatus and the specific colors may be poorly reproduced. Even in such an event, since the parameter used for compression and decompression is one, there is a problem in that the color cannot be effectively corrected for the specific color with poor reproducibility only.

BRIEF SUMMARY OF THE INVENTION

It is an object of the present invention to provide an image compression apparatus and an image decompression apparatus with improved color reproducibility as well as a method thereof by judging the color region of color image signals and choosing and using the compression system or compression parameters corresponding to each color region.

The present invention relates to an image compression apparatus comprising a color region judging section for judging the color region of the color image signal given and outputting the judging information which is the judgment result, a switch section for choosing one out of a plurality of compression parameters pursuant to the judgment information supplied from the color region judging section, and a compressing section for compressing the color image signal pursuant to the compression parameters which the switch section chooses.

According to the image compression apparatus related to the present invention, the image compression processing is not carried out with one parameter across the board as is the case of a conventional apparatus but is carried out in compliance with the optimum parameter prepared for each color region. By doing this, it is possible to provide an image compression apparatus that can achieve a color image with well-balanced reproducibility as a whole even after compression and decompression by preparing a parameter that prevents the picture quality degradation of a specific color for a plurality of, for example, scanners used.

Furthermore, the present invention relates to an image decompression apparatus comprising a color region judging section for judging the color region of the color image signal given and outputting the judging information which is the judgment result, a switch section for choosing one out of a plurality of compression parameters pursuant to the judgment information supplied from the color region judging section, and a decompressing section for decompressing and outputting the color image signal pursuant to the compression parameters which the switch section chooses.

According to the image decompression apparatus related to the present invention, the image decompression processing is not carried out with one parameter across the board as is the case of a conventional apparatus but is carried out in compliance with the optimum parameter prepared for each color region. By doing this, it is possible to restore the original color image signal by decompression processing even for the compressed color image signals compressed in compliance with the judgment information of the color regions by the image compression apparatus related to the present invention as described above. By doing this, it is possible to provide an image decompression apparatus that can achieve a color image with well-balanced reproducibility as a whole even after compression and decompression.

In addition, by using these image compression apparatus and image decompression apparatus in combination, it is possible to achieve compression and decompression processing of satisfactory color images with well-balanced colors.

DETAILED DESCRIPTION OF THE INVENTION

Referring now to drawings, the embodiments of the image compression apparatus, image decompression apparatus, and the method thereof related to the present invention will be described in detail as follows.

<First Embodiment>

Figure 1:
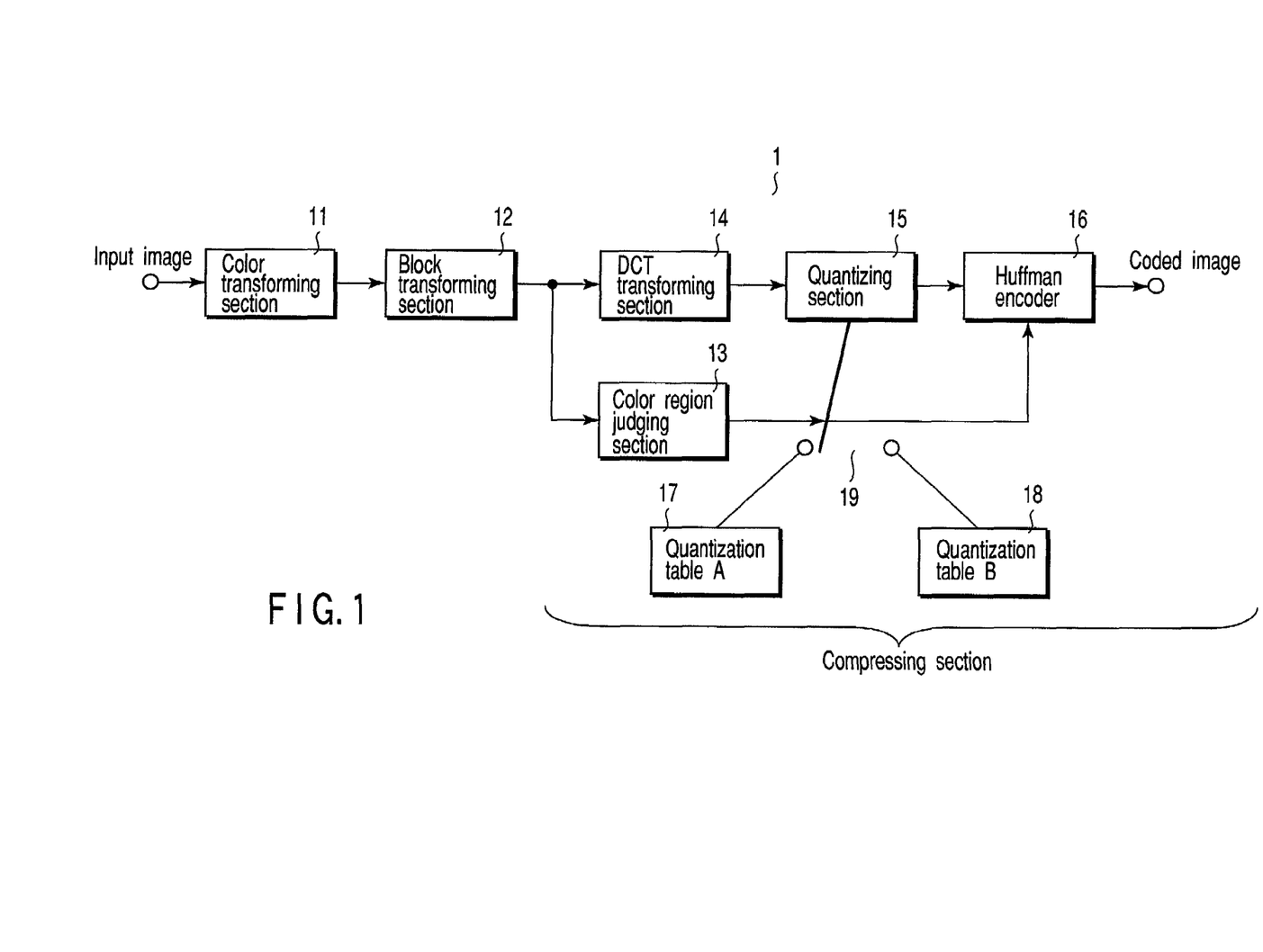
FIG. 1 is a block diagram showing a configuration of an image compression apparatus according to the first embodiment.
Figure 2:
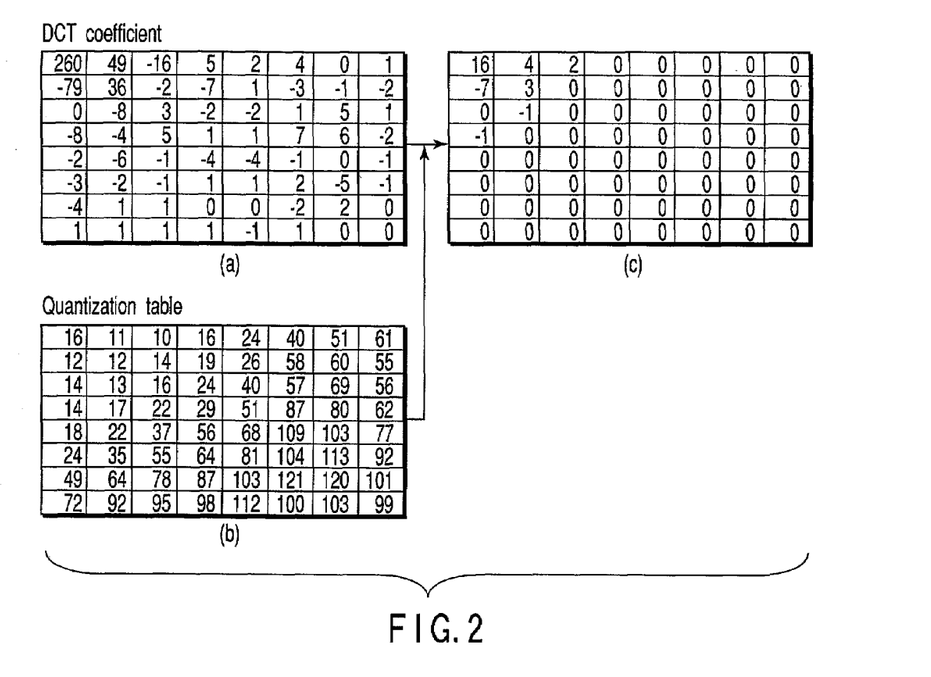
FIG. 2 is an illustration for explaining the operation of the quantizer.
Figure 3A:
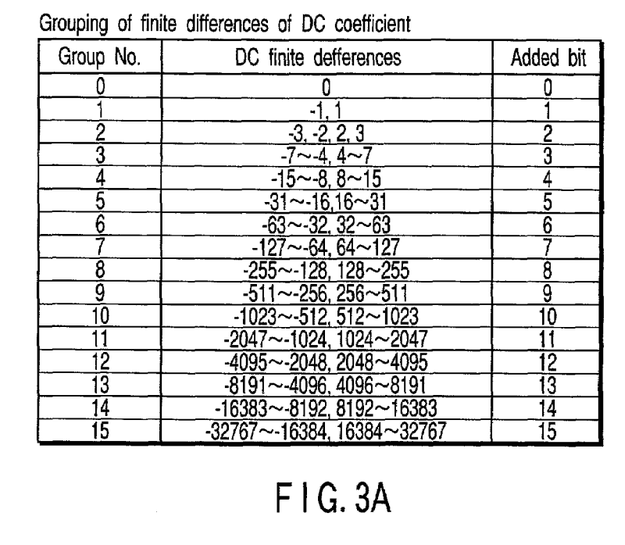
FIGS. 3A, 3B, 3C are illustrations for explaining the operation of the Huffman coding section.
Figure 3B:
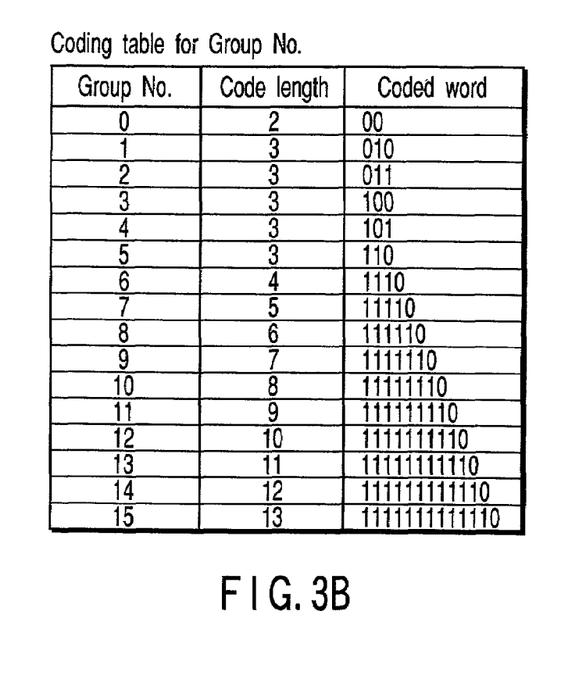
Figure 3C:
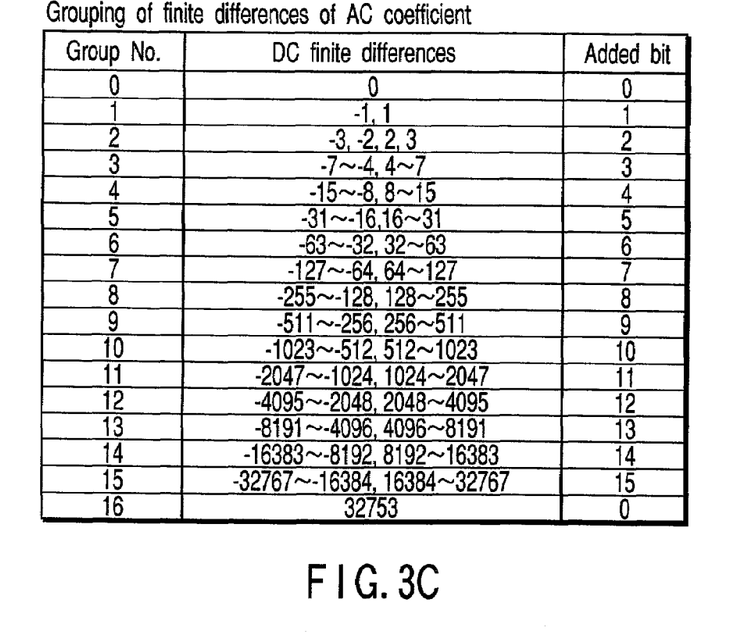
Figure 4:
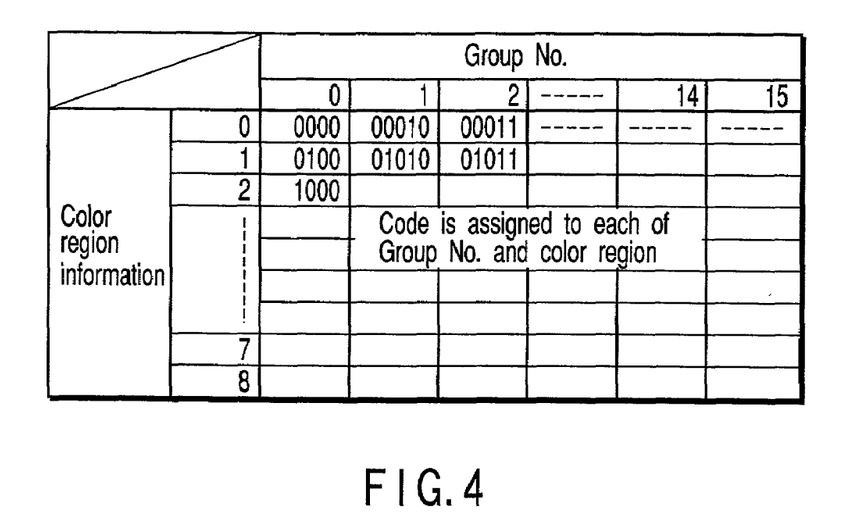
FIG. 4 is an illustration for explaining the operation of Huffman coding of the brightness dc component.
Figure 5:
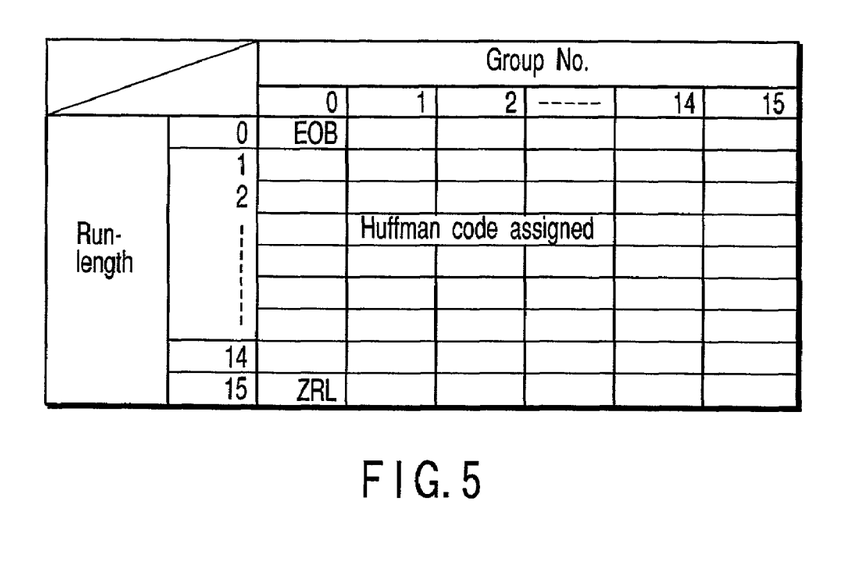
FIG. 5 is an illustration for explaining the operation of two-dimensional Huffman coding of the ac component.
Figure 6:
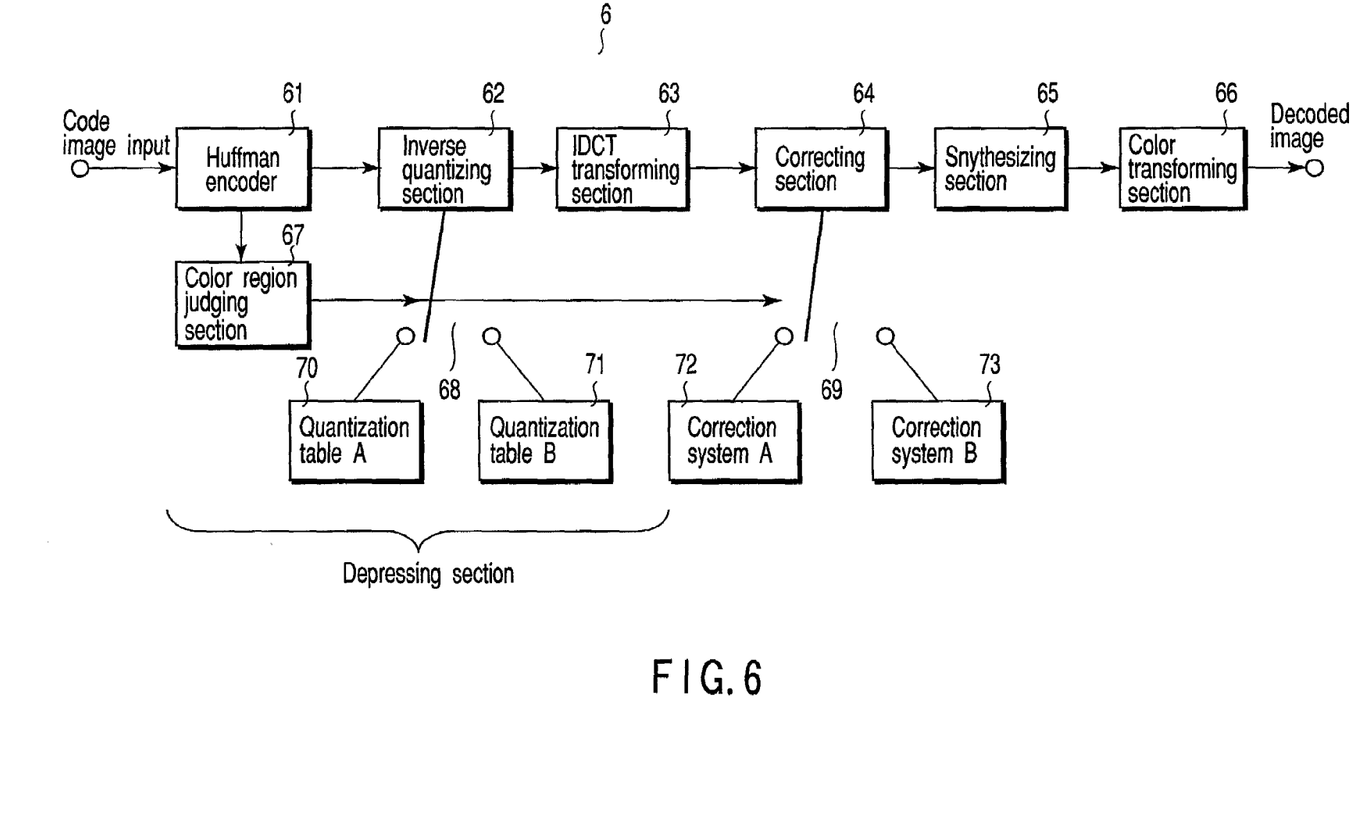
FIG. 6 is a block diagram showing a configuration of the image decompression apparatus related to the first embodiment.

The first embodiment provides an image compression apparatus that compresses the image in compliance with the parameter chosen corresponding to the color region judged by the color region judging section and an image decompression apparatus in compliance with this. FIG. 1 is a block diagram showing the configuration of the image compression apparatus related to the first embodiment, FIG. 2 is an illustration for explaining the operation of the quantizer, FIGS. 3A, 3B, 3C are illustrations for explaining the operation of the Huffman coding section, FIG. 4 is an illustration for explaining Huffman coding of the brightness dc component, FIG. 5 is an illustration for explaining the operation of two-dimensional Huffman coding of the ac component, and FIG. 6 is a block diagram showing a configuration of the image decompression apparatus related to the first embodiment.

(Image Compression Apparatus)

The image compression apparatus of the first embodiment according to the present invention is configured on the basis of the base line system proposed by JPEG (Joint Photographic Experts Group) which is the international standard of color static image coding for image compression. In FIG. 1, the image compression apparatus 1 comprises a color transforming section 11 for having a color image signal entered from the input terminal and transforming the color image signal to a color space suited for compression, a block dividing section 12 for dividing the color-transformed image into color units, and a color region judging section 13 for judging the color region from the color image signal and outputting the judgment results. In addition, the image compression apparatus 1 further comprises a DCT (Discrete Cosine Transfer) section 14 for transforming the color image signal into frequency components (DCT coefficient) by DCT arithmetic operations, a quantizer 15 for quantizing the transformed DCT coefficient, and a Huffman encoder 16 for coding the quantized DCT coefficient, and at the Huffman encoder 16, the color region judgment information to the color image signal. Furthermore, to the quantizer 15, quantization tables 17, 18 with parameters different to each other and suited for the individual color region are connected via the switch 19, and the switch 19 operates on the judgment information from the color region judging section 13.

The operation of the image compression apparatus of this kind of configuration according to the present invention will be described as follows. When the color image signal is entered into the image compression apparatus shown in FIG. 1, the color image signal is transformed into a color space suited for compression, for example, YUV, etc. For example, when the RGB signal is entered as the color image signal, the color image signal is transformed by the following formulas in the YUV transformation.

$Y=0.299*R+0.587*G+0.114*B$ $U=0.500*R-0.419*G-0.081*B$ $V=-0.169*R-0.331*G+0.500*B$

Then, the color image signal is divided into image blocks in units of 8×8 pixels, and at the color region judging section 13, the color region is judged from the chrominance signal UV and the judgment information is output for judging the color region of the color image. This color region judgment method averages the UV values of each pixel of the block-divided image, respectively, and uses them as a representative value of the block image. Based on this representative value, color judgment is carried out. For example, assume the achromatic color and chromatic color are judged at the color region judging section, then, the achromatic and chromatic colors are judged by the following conditional expressions based on the representative values.

Conditional expression 1 If U=0 and V=0, achromatic.

Conditional expression 2 Chromatic other than conditional expression 1

In this way, by setting conditional expressions for individual color regions to be judged, the color region can be judged. In the color region judging section 13, the judgment information showing the color region is outputted pursuant to this judgment result.

At the DCT arithmetic operation section 14, DCT (discrete cosine transformation) arithmetic operation is carried out for the image block in units of 8×8 pixels. This DCT arithmetic operation is carried out for the image block in units of 8×8 pixels and transform them into a space frequency component (DCT coefficient) comprising one dc component (DC) and 63 ac components (AC). DCT transformation is carried out on each of the YUV signals and each frequency component obtained from each of the signals is divided and quantized by the relevant specified quantization coefficients at the quantizing section 15. For the quantization coefficient, coefficients different for each frequency component are generally used, and the quantization coefficient for visually significant low-pass component is set smaller as compared to the quantization coefficient for the high-pass component. By this, the information volume of less visually significant high-pass component is reduced, and the compression data volume is reduced.

FIG. 2 shows the results quantized by DCT coefficients and quantization coefficients. The coefficients corresponding to individual color regions are held in the form of tables with this quantization coefficient used for a parameter. By choosing the quantization coefficient for quantizing the UV frequency component by the judgment information outputted from the color region judging section 13 in this event can vary the compression data volume for each color region. That is, as the quantization coefficient increases, the quantization value becomes coarser, and a shorter code is assigned in the coding processing, and the compression ratio increases but the picture quality degrades. Conversely, as the quantization coefficient is reduced, the quantization value becomes finer, and the picture quality is improved, but since a longer code is assigned in coding processing, the compression ratio lowers.

To give examples using the above-mentioned judgment results, if the color region judgment results in the case it is assumed to have two kinds of quantization tables of chromatic color (coarse quantization value) and achromatic color (fine quantization value) are achromatic, the table with finer quantization values is chosen, and if it is judged chromatic, the table with coarse quantization values is chosen. By this, degradation of picture quality is suppressed in the achromatic region only, and in the chromatic color, the compression ratio is increased. Consequently, both high picture quality and high compression ratio can be compatible.

Figure 13:
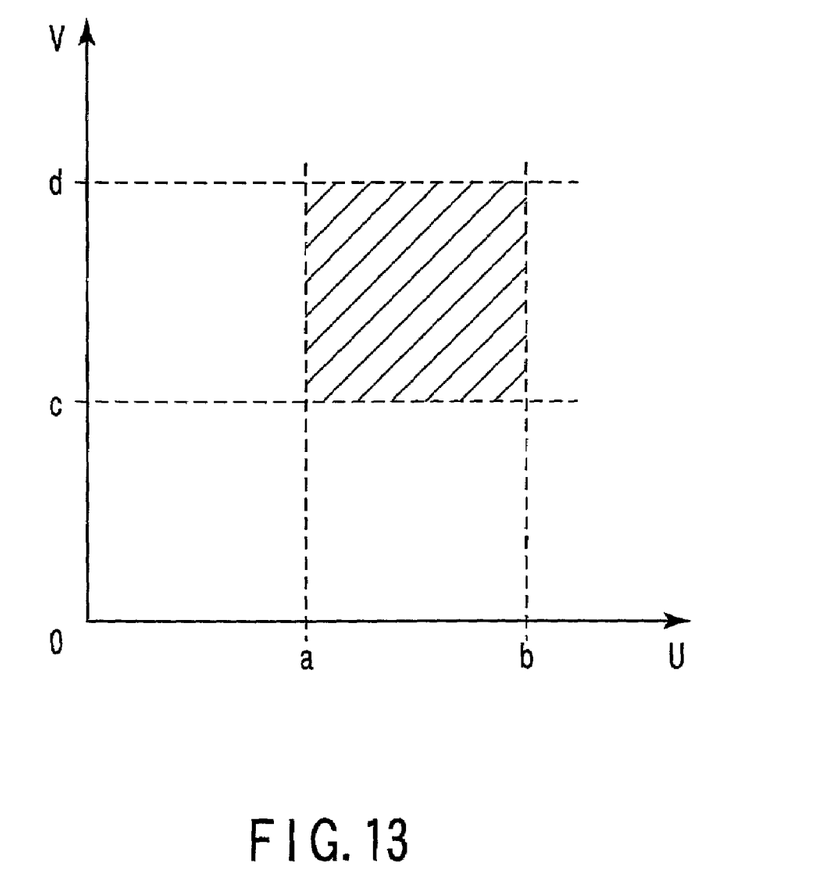
FIG. 13 is an illustration for explaining color region judgment.

To express the color region judgment conditions by the conditional equation (1) that draws the region as shown in FIG. 13, we have $$a<U<b \text{ and } c<V<d \qquad \text{Eq. (1)}$$

The conditional equation (2) is the equation other than the conditional equation (1).

By this, the specific color region (for example, red) only can be distinguished.

In accordance with the condition judgment, in the case of the conditional equation (1), a fine quantization table is chosen, and in the case of conditional equation (2), the coarser quantization table is chosen. By this, the high picture quality (to prevent picture quality degradation) is achieved, and for other regions, a high compression ratio can be achieved.

In addition, in the color region judging section 13 described above, the color region is judged by the correlation of U, V chrominance signals, and the quantization table is changed over, and using the quantization tables that vary in accord with U, V, respectively (for example, U is a fine quantization table and V a coarse quantization table), the quantization volume may be varied independently for U and V.

Each frequency component quantized at relevant quantization section 15 of YUV signals, respectively, is coded after it is divided into the dc component and ac component. In coding, the color region information is added to the code of the dc component coefficient (DC coefficient) of the Y signal of the color region information. Consequently, the coding method differs in coding the DC coefficient between the Y signal and UV signal.

First, the DC coefficient coding of UV signal is explained. Coding of the UV signal is the same as coding in JPEG. Because the dc component utilizes the high correlation with adjacent blocks, the dc component is transformed into the dc component and finite difference of the preceding block. The finite difference obtained is entered in the Huffman encoder 16 and coded. The coding method, first, finds out to which group the DC coefficient finite difference belongs, corresponding to FIGS. 3A, 3B, 3C. The DC finite difference is expressed by Group No. and additive bits. For example, because in Group No. 3 shown in FIG. 3A, eight DC finite differences (−7 . . . −4, 4, . . . 7) are included, it is expressed by the 3-bit additive bits. This addition bit is assigned with a smaller number in order of smaller DC finite difference. For example, in the case of Group 3, 000 is assigned to −7, 001 to −6, and 111 to 7. Consequently, when the finite difference of the DC coefficient is −6, it is coded as "100001".

Next, in coding the DC coefficient of the Y signal, as in the DC coefficient of UV signal, the finite difference is found and Group number and additive bit are found. And, using the two-dimensional Huffman coding, the DC coefficient is coded. FIG. 4 shows the configuration of two-dimensional Huffman coding. This two-dimensional Huffman coding determines the code by referring to a table by Group number of the finite difference found previously and the color region information. For example, assume that "1" denotes the color region information and "−3" the finite difference, the code of the color region information and Group number is "01011". To this code, the additive bit "00" of the finite difference "−3" (see FIG. 3A, the same as the assignment of the additive bit of the UV signal described above) is added, and it is coded to "0101100." To this code, the additive bit of the DC finite difference is added for coding.

On the other hand, 63 ac components of brightness component and chrominance component are zigzag-scanned successively from the visually significant low-pass frequency component and from a one-dimensional array. The ac component arranged into a one-dimensional array is coded by the use of the run-length that indicates the length of continuing 0 coefficients and the value of coefficients other than 0. That is, the two-dimensional Huffman coding is carried out using the run-length and Group No. of the effective coefficient. FIG. 5 shows the configuration of the two-dimensional Huffman coding for coding the AC coefficient. In this event, Group No. of the effective coefficient is the number assigned by the AC coefficient value as shown in Table 2. Grouping of AC coefficients is carried out in the same manner as grouping of DC coefficients. In this way, the color image signal is compressed by dividing into dc components and ac components and coded for each YUV signal.

In the case of the compression system according to the present invention in which quantization tables 17, 18 are chosen in accordance with the color region in this way, for example, if the response on a certain color is low because of visual characteristics of human eyes, the compression efficiency can be improved by improving the compression ratio with special emphasis placed on its color region. Conversely, for the color with good response, by compressing signals using the quantization table that suppresses degradation of the picture quality, satisfactory images can be obtained. As against this, when the compression ratio is varied in accordance with the color with poor response in the same manner using the conventional technique, the picture quality is degraded because the color with good response is compressed generally at the compression ratio of the color with poor response.

Consequently, according to the image compression apparatus of the present invention, judging the color region of the input image and choosing the quantization table optimized for each color region by judgment enables the correction of colors required for adjustment, and image compression of good picture quality with overall satisfactory color balance can be achieved.

(Image Decompression Apparatus)

Referring to the drawings, the image decompression apparatus for providing decompression processing to the compressed image by the image compression apparatus according to the first embodiment as described above will be explained in detail as follows.

The image decompression apparatus 6 according to the first embodiment has a configuration as shown in FIG. 6, and comprises a Huffman decoder 61 to which the compressed image is entered from the image compression apparatus via the input terminal and which decodes the Huffman code, an inverse quantizing section 62 for inverse-quantizing the quantized DCT coefficients, an IDCT (inverse discrete cosine transformation) transforming section 63 for inverse-transforming the DCT coefficient, a correction section 64 for correcting the decoded image, a synthesizing section 65 for synthesizing the image in units of 8×8 pixels, and a color space transforming section 66 for transforming the YUV-transformed image data to the original RGB signals. Furthermore, a control 67 for outputting control signals by the decoded color region information, a switch 69 for changing over the inverse quantization table, and a switch for changing over correction processing are provided for changing over quantization tables 70, 71 and correction systems A, B, 72, 73, respectively.

The image decompression apparatus 6 with this kind of configuration carries out decompression processing as shown as follows. That is, the compressed image entered in the input terminal holds the Y signal, and the DC component of the UV signal and ac component decoding tables at the Huffman decoder 61. In decoding the dc component of Y signal, first, the color information and Group No. are decoded from the code data coded by the two-dimensional table (color information, Group No.).

For example, if there is a DC coefficient of Y signal coded as "0101100," the two-dimensional Huffman table of Y signal is referred to, and the color information and Group No. obtained from "01011" from 5 bits from the head are "1", and "2", respectively as shown in FIG. 4. This Group No. "2" is decoded using the remaining 2 bits as the finite difference of the DC coefficient is shown in FIG. 3A. By this, from this coded data, color information "1" and finite differential "−3"are decoded.

The decoded color information is stored in a memory and used for choosing the table at the time of inverse quantization. Then, from Group No. and decoded finite differential, the finite differential of the DC coefficient is decoded, and is added to the DC component of the block decoded previously.

For the dc component of the YU signal, the coded Group No. is encoded, and the finite difference coded on the basis of Group No. is decoded. And by adding the DC component of the preceding block DC achieves decoding.

Decoding of the AC component of the YUV signal means to decode block No. of run-length (number of continuing 0s) coded by the two-dimensional table and the block No. of the effective coefficient. "0"is decoded in the quantity shown by the decoded run-length and the AC enumerated value which is shown by Group No. is decoded. In this way, the coded image data and the color region information are decoded.

The decoded quantized value is entered into the inverse quantizing section 62 and inverse-quantized by multiplying the quantized value by the values of quantization tables 70, 71. In this event, by changing over the switch 68 in accordance with the color region information by which the quantization table was stored in the memory, the table same as the quantization table which was chosen at the time of compression, is chosen. The same quantization table is reserved in advance for the image compression apparatus 1 and the image decompression apparatus 6.

The inverse-quantized data is entered into the IDCT transforming section 63 and is transformed from the space frequency components to the original image signal.

At the correction section 64, the compressed image is corrected by filer processing, for example, smoothing processing. In this smoothing processing, the average value of the relevant pixel and pixels in the vicinity is found and it is relocated as the relevant pixel value. In compliance with the color region information, the switch 69 is changed over and whether the processing should be carried or not is decided. By doing this, correction processing can be provided to the color region only required for correction. Preparing a plurality of parameters 72, 73 for correction processing and switching the correction method by the switch 69 for each color region enables the selection of the correction processing required for individual color regions.

At the synthesizing section 65, the image block in units of 8×8 pixels are combined into the original image size. At the color transforming section 66, the YUV signal is transformed into the RGB signal to return to the original color image signal, and decompression processing is completed.

In this way, in the image decompression apparatus 6, by taking out the color region information from the code data, parameters the same as the parameters used in the image compression apparatus 1 can be chosen. Consequently, by carrying out decompression processing in compliance with the compression parameters, color images with well-balanced colors can be obtained. In addition, because carrying out correction processing for decoding results in each color region can achieve correction processing in compliance with the characteristics of the desired color regions, it is possible to provide an image decompression apparatus that can achieve generally well color-balanced good decompression results.

By this, using the image compression apparatus and image decompression apparatus in combination can achieve compression decompression processing with satisfactory color balance.

<Second Embodiment>

Figure 7:
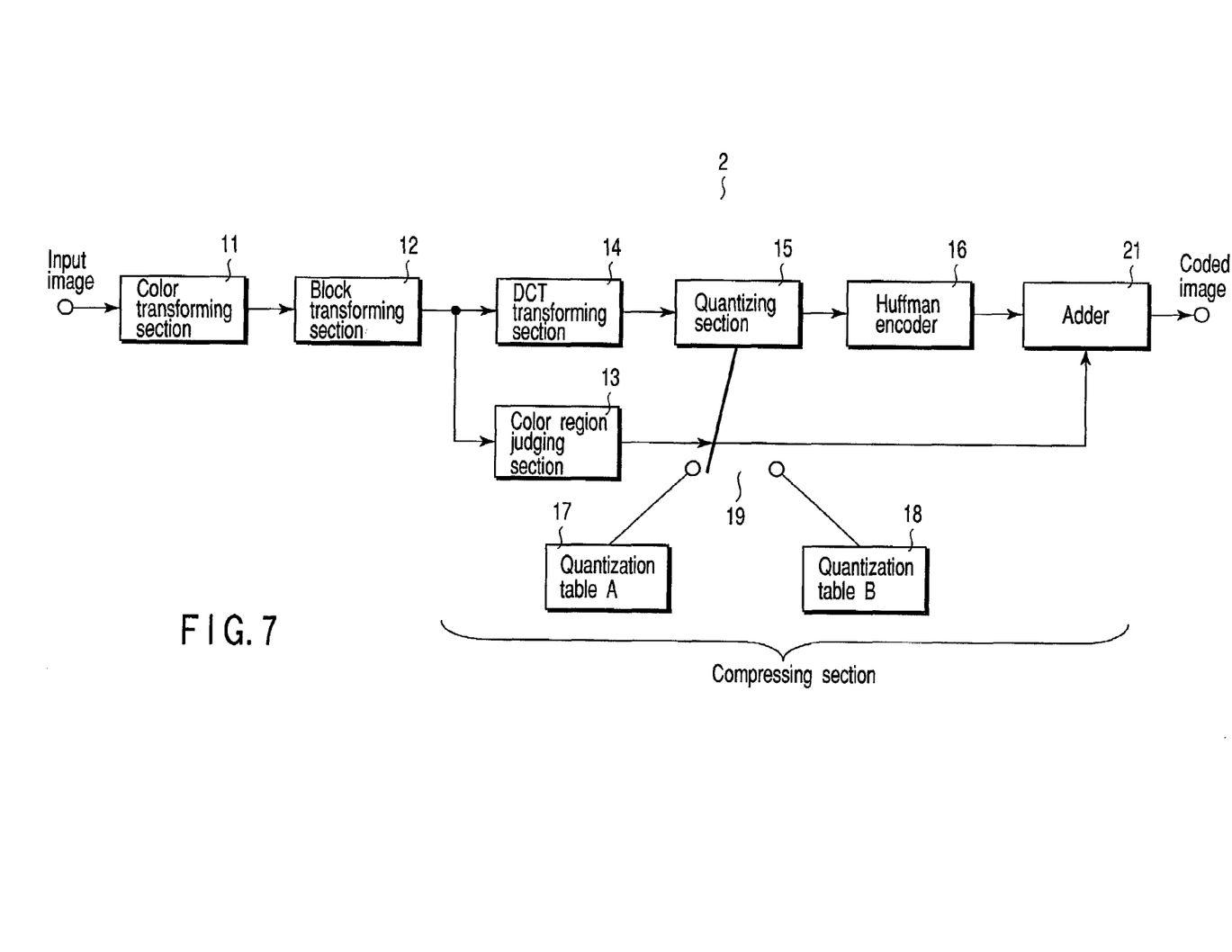
FIG. 7 is a block diagram showing a configuration of the image compression apparatus related to the second embodiment.
Figure 8:
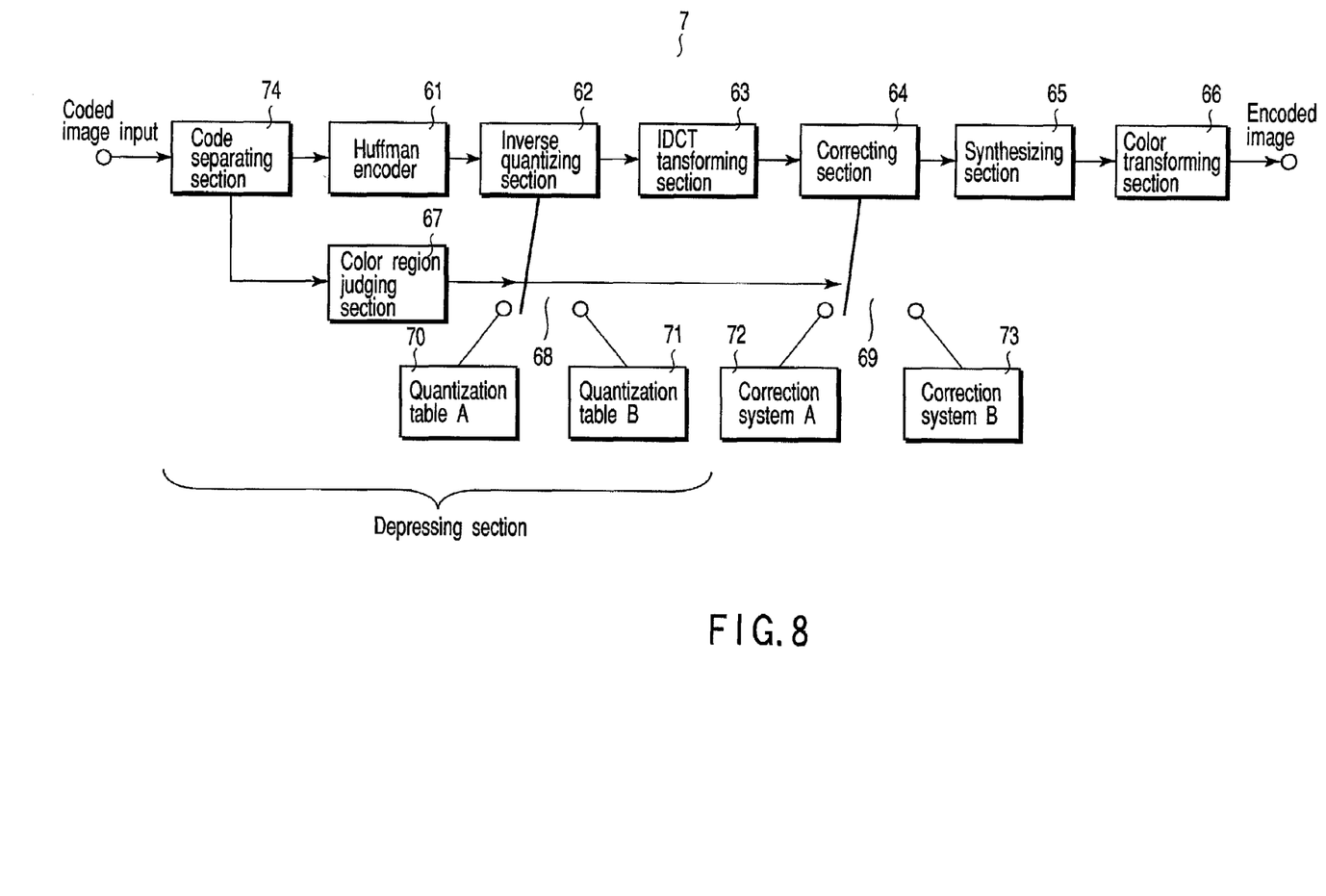
FIG. 8 is a block diagram showing a configuration of the image decompression apparatus related to the second embodiment.

The second embodiment is to provide an image compression apparatus that adds the color region information to the compressed color image signal and an image decompression apparatus for decompressing the color image signal compressed by the image compression apparatus. FIG. 7 is a block diagram showing a configuration of the image compression apparatus related to the second embodiment and FIG. 8 is a block diagram showing a configuration of the image decompression apparatus related to the second embodiment.

(Image Compression Apparatus)

The image compression apparatus 2 of the present invention is shown in FIG. 7, and a repetitive description of parts indicated by the same reference numerals will not be given. The second embodiment is also configured in compliance with JPEG.

The Huffman encoder 16 codes by the method used in JPEG, and further, the adder 21 specific to the second embodiment adds the color region information to the Huffman code.

In this kind of image compression apparatus, the color image signal entered is divided into image blocks in units of 8×8 pixels, and the color region is judged for each block by the color region judging section 13. At the DCT transforming section 14, the block image is frequency-transformed into dc components and ac components. For the transformed frequency components, quantization is carried out for each color region and Huffman-coding takes place.

And at the adder 21, bits that show the color region is added to the coded data for the dc component of the Y signal that underwent Huffman coding. For example, assume that the dc component of the Y signal is coded into 100001 by Huffman coding. Assume that the color region judging signal to be added is 010, then, the added coding data becomes 010100001. In this way, the color image signal is compressed. By this, the color region information can be added to the color image signal.

(Image Decompression Apparatus)

FIG. 8 shows the configuration of the image decompression apparatus that corresponds to the image compression apparatus related to the second embodiment. In this figure, the image decompression apparatus 7 has a code separating section 74 for separating the color region information and coding data from the coding data entered, and sends the coding data only separated at the separating section 74 to the Huffman decoder 61, and carries out decoding. The color region information separated is sent to the switch 68, undergoes the selection of quantization tables 70, 71, and decoded by the parameters the same as the parameters used for compression. In the correcting section 64, the correction systems 72, 74 are changed over on the basis of the color image information.

By adding the color region information to the data coded in this way, the circuit configuration can be simplified as compared to the image decompression apparatus of the first embodiment, and reduction in size of the image compression and decompression apparatus can be enabled.

<Third Embodiment>

Figure 9:
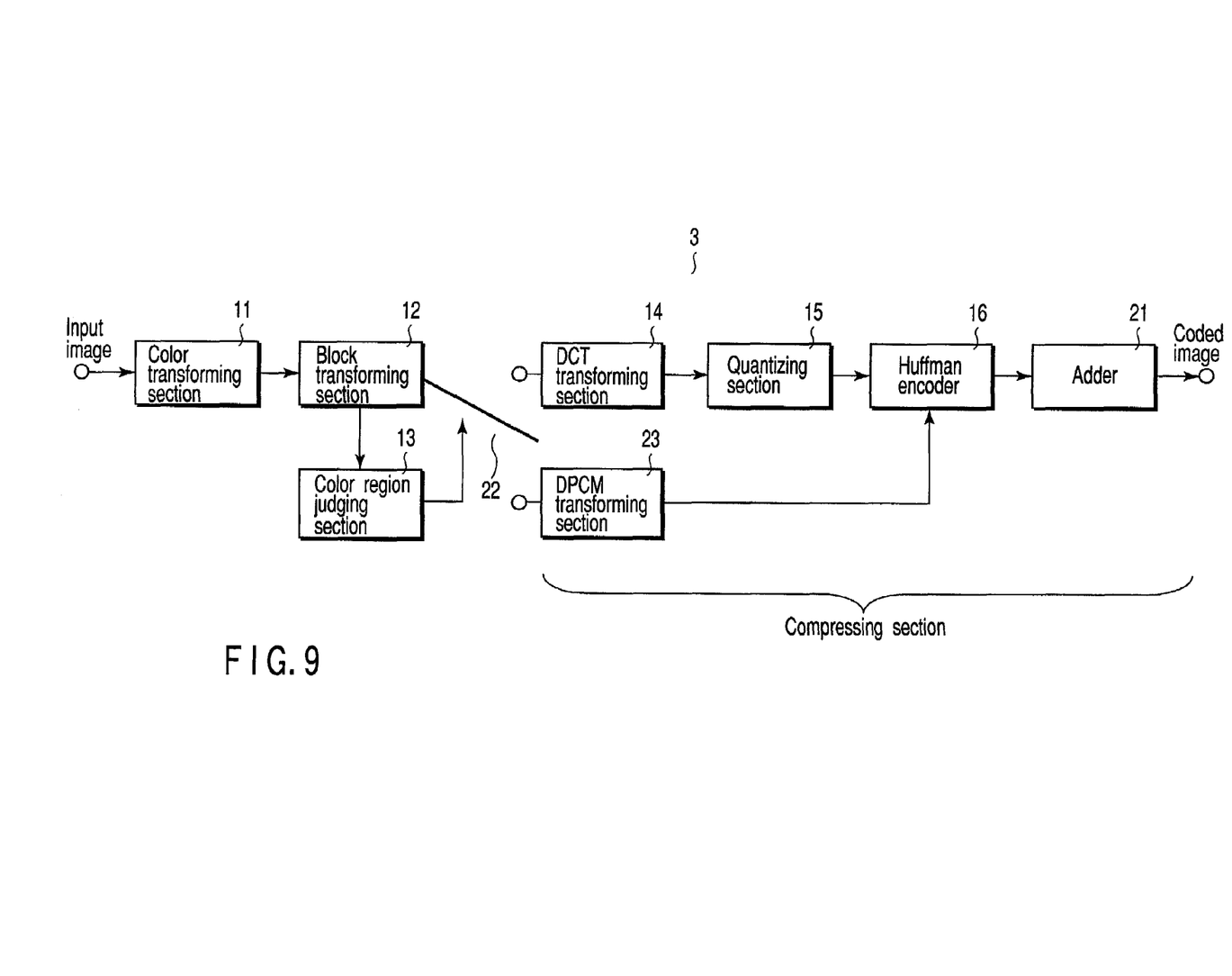
FIG. 9 is a block diagram showing a configuration of the image compression apparatus related to the third embodiment.
Figure 10:
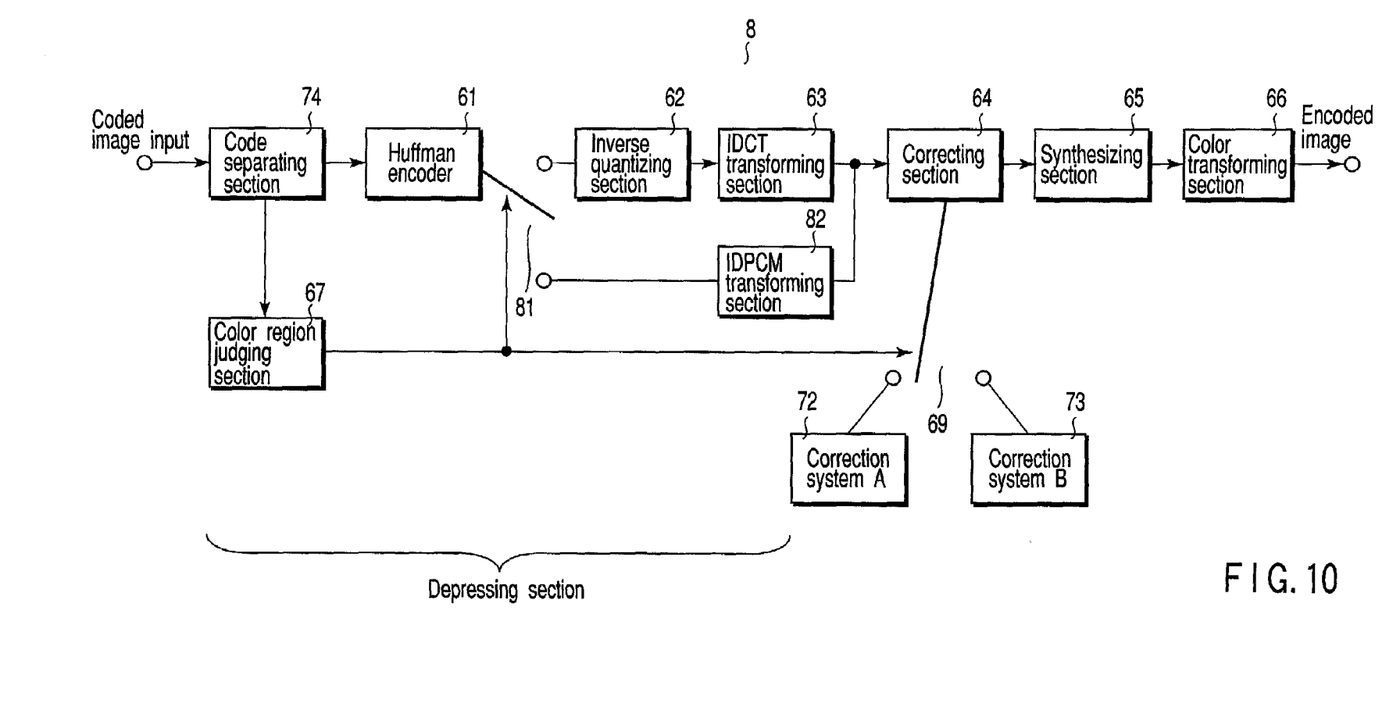
FIG. 10 is a block diagram showing a configuration of the image decompression apparatus related to the third embodiment.

The third embodiment provides an image compression and decompression apparatus and an image decompression apparatus that change over the compression system and decompression system in compliance with the color region judging information. FIG. 9 is a block diagram showing a configuration of the image compression apparatus related to the third embodiment and FIG. 10 is a block diagram showing a configuration of the image decompression apparatus related to the third embodiment.

(Image Compression Apparatus)

The configuration of the image compression apparatus 3 related to the third embodiment of the present invention is shown in FIG. 9, and the processing sections having the same reference numerals as those of the first embodiment mentioned above will be omitted. The third embodiment is also configured in compliance with JPEG. The image compression apparatus 3 has a DCT transforming section 14 and DPCM (Differential Pulse Code Modulation) transforming section 23, and has a switch 22 for changing over the two kinds of transforming systems based on the color region judgment results, and codes the data transformed by the two kinds of transforming systems at the Huffman encoder 16.

The color image signal entered is color-transformed into YUV signals, which are divided into image blocks in units of 8×8 pixels, and the color region for each block is judged by the color region judging section 13. Based on the judgment results of each block, either one of the two transforming sections 14, 23 is chosen to transform block images. When the DCT transforming section 14 is chosen based on the color region judgment results, DCT transformation, quantization, and Huffman coding take place in compliance with the JPEG baseline system, and compression is carried out. With respect to the color region information, the data coded for each block is added to the data at the adder 21.

When the DPCM transforming section 23 is chosen, the finite difference between the targeted pixel and the pixel one pixel before is found and outputted (the same method of coding the dc component as in the first embodiment). The finite difference outputted is coded by the Huffman coding table of the Y signal dc component of JPEG. Since in the coding efficiency, the finite difference for each pixel in the block image is found, a strong correlation is found and the finite difference becomes a very small value. Consequently, even when the compression is carried out using Huffman coding, good efficiency is achieved, and since it is the reversible compression, the picture quality is free of degradation. In this event, the color region information is also added to each block at the adder 21.

By changing over the compression method in accordance with the color region judgment results in this way, for example, if the reproduction of a specific color region is poor in a certain output equipment, the above-mentioned reversible compression is used for the compression method of the specific color and compression and decompression is carried out. By this, the characteristics of the output equipment is no longer emphasized by compression and decompression, and degradation of picture quality can be prevented. Conversely, for other color regions, there is no problem for output characteristics, and compression is carried out by the use of JPEG. Assigning the specific processing to the desired color regions in this way can achieve generally color-balanced compression processing.

(Image Decompression Apparatus)

Explanation is made on the image decompression apparatus for decompressing color image signals compressed by the image compression apparatus of the third embodiment. FIG. 10 shows the configuration of the image decompression apparatus 8. Now, for the new component element, an IDPCM transforming section 82 and a switch 81 for selecting the decoding system are shown.

In the image decompression apparatus 8 of the third embodiment in this kind of configuration, the color region information and coding data are separated from the data coded for each block at the separating section 74. From the separated color region information, the control signal that changes over the decoding system is outputted. For example, when the block compressed by DCT is entered, the route of processing is chosen such as the Huffman decoder 61, inverse-quantizing section 62, and IDCT transforming section 63, by the control signal outputted from the separator, and decoding processing takes place. When the block compressed by DPCM is entered, the IDPCM transforming section 82 is chosen by the switch 81 by the control signal outputted from the code separator 74, and decoding takes place. Decoding in this way enables decoding for at least two kinds of compression systems. Furthermore, the decoded data is corrected for each color region at the correcting section 64, a block image is synthesized, color space transformation is carried out, and decoding is completed.

In this way, by having transforming section 63, 82 of two kinds of decoding systems in the image decompression apparatus, decoding can be achieved in compliance with the compression system chosen at the image compression apparatus.

As described above, according to the image compression apparatus and the image decompression apparatus related to the third embodiment, an appropriate transforming system can be chosen and the data can be compressed corresponding to the color region information, and the data can be decompressed corresponding to the transformation system chosen, and it thereby becomes possible to obtain color image signals by good compression and decompression with the generally satisfactory color balance.

<Fourth Embodiment>

Figure 11:
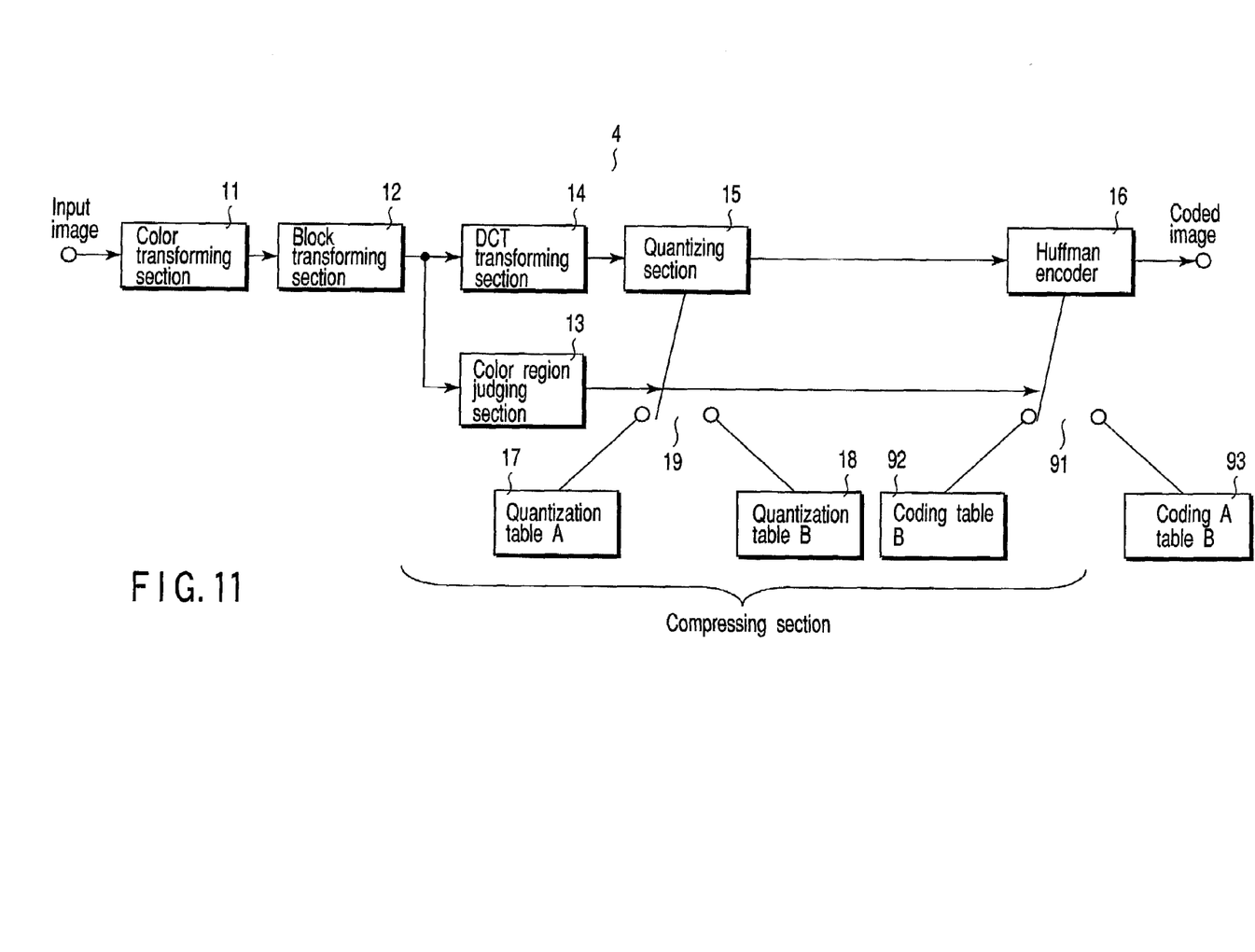
FIG. 11 is a block diagram showing a configuration of the image compression apparatus related to the fourth embodiment.
Figure 12:
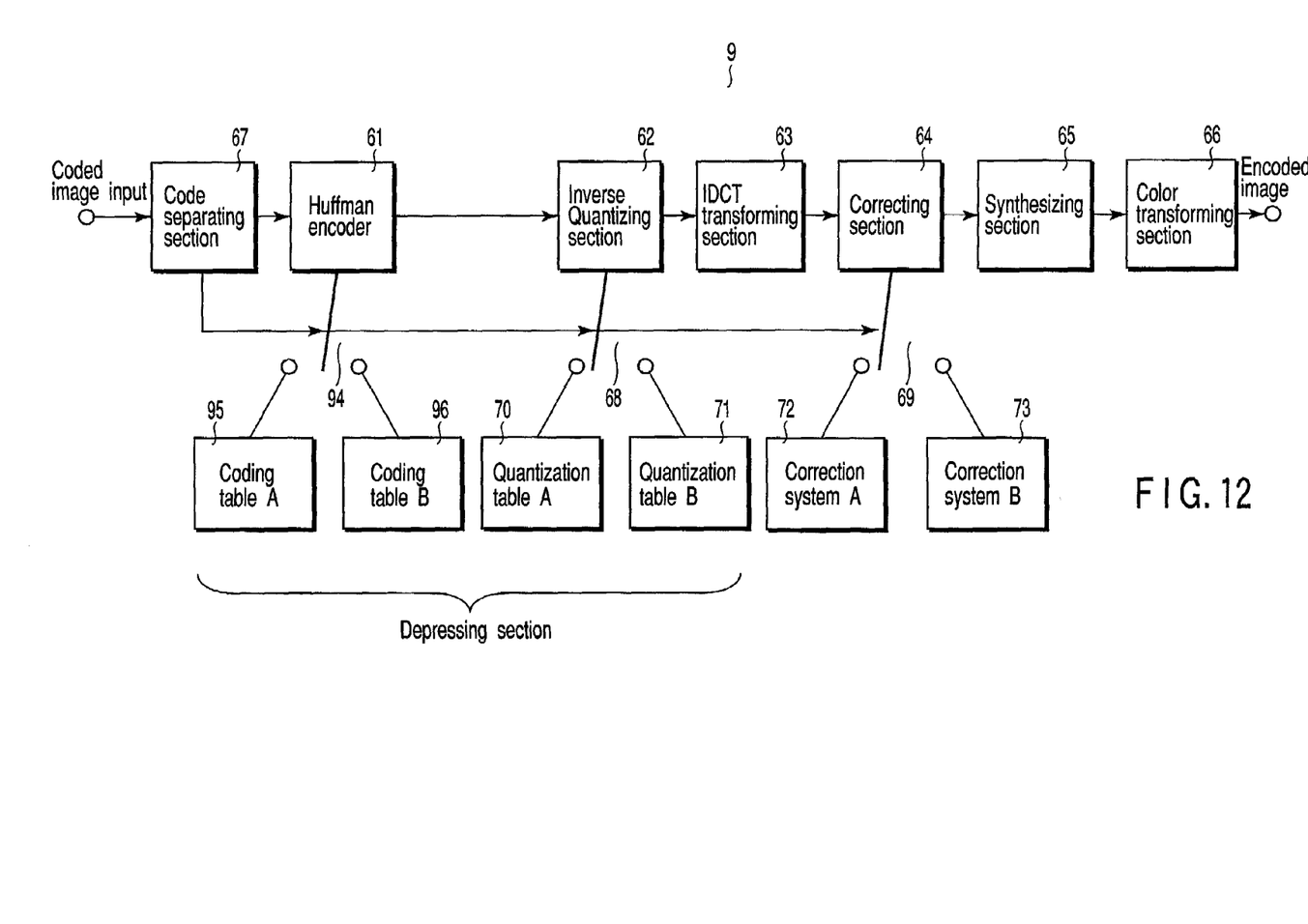
FIG. 12 is a block diagram showing a configuration of the image decompression apparatus related to the fourth embodiment.

The fourth embodiment is to provide an image compression apparatus and image decompression apparatus that can change over coding parameters of the Huffman encoder corresponding to the color region judging information. FIG. 11 is a block diagram showing a configuration of the image compression apparatus related to the fourth embodiment and FIG. 12 is a block diagram showing a configuration of the image decompression apparatus related to the fourth embodiment.

(Image Compression Apparatus)

The configuration of the image compression apparatus 3 related to the fourth embodiment of the present invention is shown in FIG. 11, and a repeative description of parts indicated by the same reference numerals will no be given. The fourth embodiment is also configured in compliance with JPEG. The image compression apparatus 4 has a plurality of coding tables 92, 93 for the Huffman coding section 16, and has a switch 91 for changing over the coding tables in compliance with the color region judgment results.

By this kind of configuration, parameters for suitable Huffman coding in compliance with the color region judgment results can be prepared. Consequently, this makes it possible to correct the propensity to specific colors and it thereby becomes possible to obtain color image signals by a good compression and decompression with a generally satisfactory color balance.

(Image Decompression Apparatus)

The configuration of the image decompression apparatus 9 related to the fourth embodiment of the present invention is shown in FIG. 12, and a repeative description of parts indicated by the same reference numerals will not be given.

In this image decompression apparatus 9, the switch 94 for operating corresponding to the color region judgment information outputted from the color region judgment section 67 with the compression image signal given is newly installed. This switch 94 is to change over the decoding table A95 and the decoding table B96 for providing the same decoding parameters used in the image compression apparatus 4 to the Huffman decoder 61.

By this kind of configuration, the decoding parameters used in Huffman coding for the compressed image supplied from the image compression apparatus 4 of the fourth embodiment are provided in conformity with the color region judging information. By this, it is possible to decompress the compressed image from the image compression apparatus related to the forth embodiment.

Consequently, according to the image compression apparatus and the image decompression apparatus related to the fourth embodiment, quantization and correction are not only processed corresponding to the color region judging information of the color image information but also Huffman coding and encoding can be processed corresponding to the color region judging information of the color image information. Because by this, it becomes possible to adjust the compression ratio and decompression ratio for each specific color region, the present invention can provide an image compression apparatus and image decompression apparatus as well as the processing method thereof that enable compression and decompression processing with generally good color balance.

As described above, the present invention is described in detail referring to the drawings, and in the above-mentioned embodiments of the present invention, YUV signals are used for color region judgment at the color region judging section of the image compression apparatus, but a color region judging section that judges the color region by, for example, RGB signal, and other signals may be equipped.

In the above-mentioned embodiment of the present invention, two sets of the color region judging conditional equations are used, but the conditional equations shall not be limited to two sets but two or more sets of conditional equations may be used.

In the above-mentioned embodiments according to the present invention, JPEG is used for the compression system, but other compression method may be equipped.

In the above-mentioned embodiments according to the present invention, two sets of quantization tables are used, but they shall not be limited to two sets but a plurality of quantization tables may be used.

In the above-mentioned embodiments according to the present invention, Huffman coding is used as an example, but arithmetic coding or other coding systems may also be used.

In the above-mentioned embodiments according to the present invention, nonreversible compression in DCT transformation and reversible compression in DPCM are used, but other compression systems may be combined.

As described above, according to the present invention, the color region of the color image is judged and the compression system is used corresponding to each color region. For example, even if the compression ratio is increased for a certain color region, only a slight image degradation results. In such an event, the compression system with an improved compression ratio using nonreversible compression is used. Conversely, with respect to the color region with high image degradation, a compression system free of image degradation using reversible compression is used. By this, it becomes possible to provide an image compression apparatus and image decompression apparatus and the method thereof that enables compression and decompression of color image signals with generally good color balance.

The invention claimed is:

1. An image compression apparatus comprising:
    a color region judging section for judging the color region of the color image signal given and outputting the judgment information as the judgment result;
    a switch section which chooses one parameter out of a plurality of compression parameters based on the judging information supplied from the color region judging section;
    a compressing section which compresses color image signals based on the compression parameters chosen by the switch section;
    a color transforming section which transforms color image signals into a color signal which is a chrominance signal, and supplies the color signal to the color region judging section and the compressing section; and
    an adder which adds the judgment information supplied from the color region judging section to the compressed color image signal outputted from the compressing section,
    wherein the color region judging section judges the color region using the correlation of chrominance signal,
    wherein the compressing section includes an encoder to which the color image signal compressed corresponding to the compression parameters is supplied from the compressing section and which codes the color image signal,
    wherein the encoder has coding information for each color region judged by the color region judging section.

2. An image decompression apparatus comprising:
    a color region judging section which judges a color region of a color image signal given and which outputs judgment information as a judgment result;

a switch which chooses and functions one of a plurality of compressing sections corresponding to the judgment information supplied from the color region judging section;

a decompressing section which decompresses the compressed color image signal and which outputs the color image signal corresponding to the compression parameters chosen by the switch;

a correcting section which corrects the color image signal output from the decompressing section corresponding to the judgment information supplied from the color region judgment section; and a code separating section which separates the coded data added to the compressed color image signal and supplies the separated coded data to the decompressing section, wherein the color region judging section judges a color region from the color regions for each region which the compressed color image signal includes.

3. An image compression method comprising:

judging a color region of a color image signal given and outputting judgment information as a judgment result;

choosing one parameter out of a plurality of compression parameters based on the judging information;

compressing color image signals based on the compression parameters chosen by the choosing step, transforming the compressed color image signals into a color signal which is a chrominance signal, and performing the judging and compressing steps with respect to the color signal; and adding the judgment information supplied from the judging step to the compressed color image signal outputted from the compressing step, wherein the color region judging step judges the color region using the correlation of chrominance signal, wherein the compressing step performs encoding to which the color image signal compressed corresponding to the compression parameters is supplied from the compressing step and in which the encoding encodes the color image signal, and wherein the encoded color image signal includes coding information for each color region judged by the color region judging step.

4. An image decompression method comprising:

judging a color region of a color image signal and outputting judgment information as a judgment result;

choosing one of a plurality of compressing sections corresponding to the judgment information output from the color region judging step;

decompressing the compressed color image signal and outputting the color image signal corresponding to the compression parameters chosen by the choosing step;

correcting the color image signal output from the decompressing section corresponding to the judgment information supplied from the color region judgment step; and separating the coded data added to the compressed color image signal and supplying the separated coded data to a decompressing section for performing decompressing of the separated coded data, wherein the color region judging step judges a color region from the color regions for each region which the compressed color image signal includes.

5. The image compression apparatus according to claim 1, wherein the coding information includes finite difference information obtained from adjacent blocks of a dc component of color image data, and wherein the color image data includes an ac component for which the ac component is run-length encoded.

6. The image compression apparatus according to claim 5, wherein ac coefficients are obtained from the ac component, and dc coefficients are obtained from the dc component, and wherein the ac coefficients are grouped in a same manner as the dc coefficients.

* * * * *